Aug. 17, 1948.  A. WARRING  2,447,221
PIPE COUPLING AND FASTENING DEVICE
Filed Jan. 7, 1946
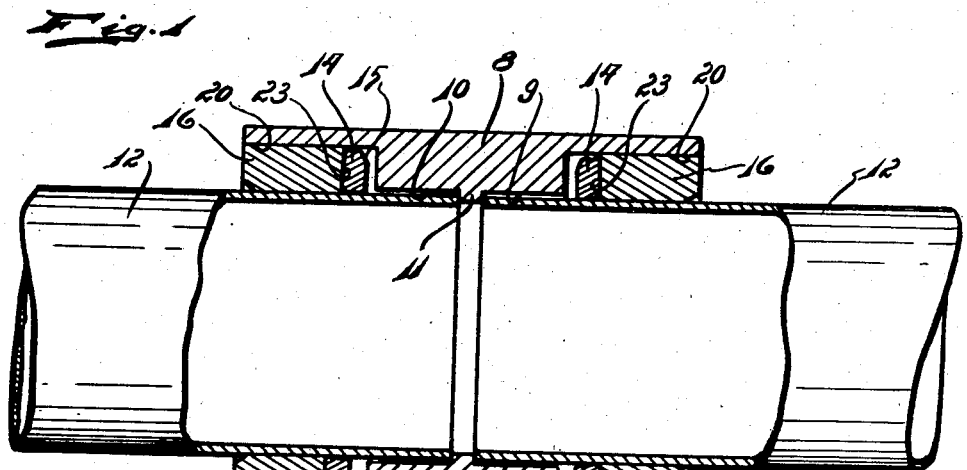
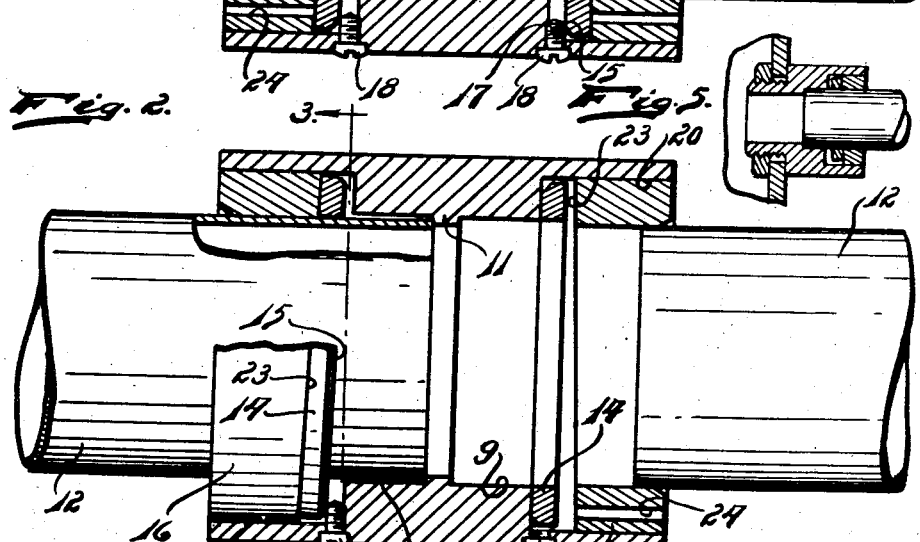
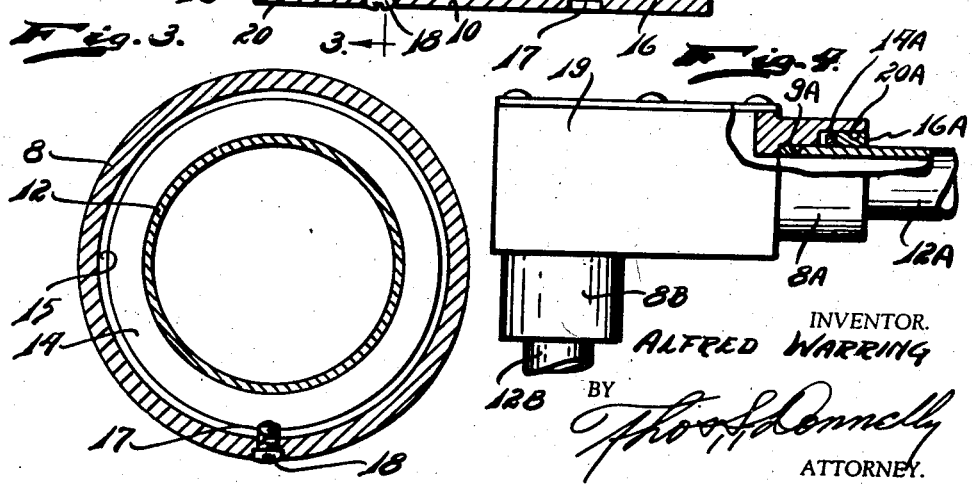
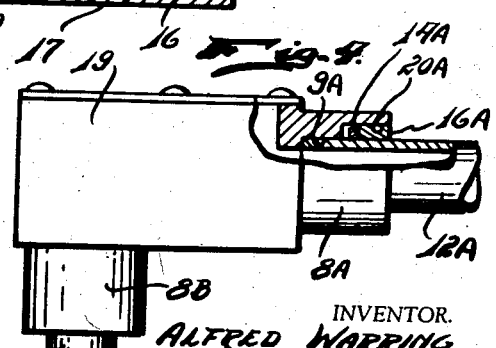
INVENTOR.
ALFRED WARRING
BY
Thos. J. Donnelly
ATTORNEY.

Patented Aug. 17, 1948

2,447,221

UNITED STATES PATENT OFFICE 2,447,221

PIPE COUPLING AND FASTENING DEVICE

Alfred Warring, Detroit, Mich., assignor, by mesne assignments, of one-third to said Warring, one-third to Norman A. Grams, and one-third to William Noponen.

Application January 7, 1946, Serial No. 639,527

7 Claims. (Cl. 285—193)

My invention relates to a new and useful improvement in a pipe coupling and fastening device adapted as a simple and effective means for securing opposed ends of pipes or conduits in fixed relation to each other. The invention is particularly useful in securing addition ends of electric conduits in fixed relation.

It is an object of the invention to provide a coupling so arranged and constructed that the adjacent ends of the pipe sections may be easily and quickly secured together in such a manner that they are held rigid and cannot be torn apart.

Another object of the invention is the provision of a coupling or connector of this class in which the threading of sections of the coupling together is eliminated with a resultant saving of labor in effecting the connection. Another object of the invention is the provision of a coupling of this class which may be mounted in position to secure adjacent ends of conduits together without the use of any tools.

Another object of the invention is the provision of a coupling so arranged and constructed that when mounted in position the entire conduit line will be grounded.

Another object of the invention is the provision of a coupling of this class which will be simple in structure, economically manufactured, durable, compact-like and highly efficient in use.

Other objects will appear hereinafter.

It is recognized that various modifications and changes may be made in the detailed structure illustrated without departing from the invention in itself and it is intended that such variations and modifications shall be embraced within the claims which form a part hereof.

Forming a part of this specification are drawings in which,

Fig. 1 is a longitudinal central vertical sectional view of the invention showing it applied with parts of the pipes broken away.

Fig. 2 is a view similar to Fig. 1 showing one of the connectors moved to inoperative position.

Fig. 3 is a sectional view taken on line 3—3 of Fig. 2,

Fig. 4 is a side elevational view showing a slight modification of the invention with parts broken away and parts shown in sections.

Fig. 5 is a side elevational view showing a further modified form of the invention with parts broken away and parts shown in section.

As shown in the drawings the invention comprises a tubular retainer 8 having a bore 9 projected inwardly from one side and a bore 10 from the other separated by the inwardly projecting rib 11 which extends circumferentially of the retainer 8. The conduit or pipe ends 12 are inserted as a snug fit in the bores 9 and 10 so that the opposed ends of the conduits or pipes are retained within the retainer 8. This retainer 8 is constructed the same at its opposite ends so that a description of one will suffice for both. Formed in the end of the retainer 8 is an enlarged bore 20 in which is positioned an angular locking member 14 which is angled or inclined as at 15 extending around the ring 14 on one face thereof. The other face of this ring 14 is planar. A fit of the ring 14 on the pipe section 12 is a loose one to permit a certain amount of tilt of the ring 14 relatively to the pipe 12. Pressed in the bore 20 is a retaining ring 16 having its inner face 23 inclined so that the retaining ring 16 is wider at one end than at the other. Formed in the retainer 8 is a threaded opening 17 in which a set screw 18 may be threaded.

The construction is such that as the pipe ends 12 are inserted in position they will freely pass through the ring 14. However when the ring 14 is tilted to the axis of the retainer 8 or the pipe section 12 the ring will bind against the pipe section 12 and prevent its withdrawal. The fit between the ring 14 and the pipe section 12 is such that as an attempt is made to withdraw the pipe section 12 from the bore 9 or 10 as the case may be the ring 14 will have have a tendency to ride with the pipe section 12. This movement will continue until it strikes the inclined face 23 whereupon it will be brought into a tilted position and thus bind the pipe section 12 and prevent removal of the same from the retainer 8. When the screws 18 are threaded inwardly the ring 14 is always held in the clamping position so that it would be impossible to withdraw the pipe section 12 from the retainer 8. When it is desired to release the ring 14 to releasing position the screw 18 may be backed outwardly and a suitable tool such as a rod or the like inserted inwardly through the passage 24 formed in the retaining ring 16 so as to force the ring 14 into releasing position and when this is done the pipe section 12 may be easily removed from the retainer 8.

It is thus seen that I have provided an effective and simple means for securing adjacent ends of pipe sections together without requiring any threaded parts or tools for securing the pipes sections in the coupling mechanism. The structure is one which has proven most efficient and one which provides for a considerable saving as to time in its installation. The screws 18 are threaded in position and the pipes 12 are electrically connected through the retainer 8 so that the entire conduit may thus be grounded.

Fig. 4, I have shown a slight modification in which the retainer 19 is provided at one end with the section 8—A and at its opposite end with a section 8—B. Pipe 12—B is inserted in the section 8—B and a pipe 12—A is inserted in the section 8—A the section 8—A being constructed similar to the section 8—B. Formed in this part 8—A is an enlarged bore 20—A communicating with the bore 9—A in which the end of the pipe 12—A is inserted. The retaining ring 16—A shown in Fig. 1 is also present and the locking ring 14—A is used. The construction and operation is the same and the advantages referred to as to the structure shown in Fig. 1 are present in the structure shown in Fig. 4 excepting that Fig. 4 illustrates a construction used for connecting pipe sections together which extend at an angle to each other and which are not in alinement as shown in Fig. 1.

In Fig. 5 I have shown a further modified form where it is desired to secure pipe 12C to a terminal or outlet box 30. The retainer 8C is provided with a reduced end 31 adapted to enter and project into an opening formed in a side wall of a terminal or outlet box 31, and be secured thereto by nut 32 threaded on the reduced end 31. The construction and operation for securing the pipe 12C is the same, also as to the advantages referred to, as the structure shown in Fig. 1, excepting, that Fig. 5 illustrates a construction where the end of the pipe terminates within a terminal or outlet box.

What I claim as new is:

1. A pipe coupling of the class described adapted for securing adjacent ends of pipes in fixed relation to each other comprising a retainer having a bore formed therein for the reception of a pipe end, said retainer having an enlarged bore communicating with said first mentioned bore; a locking ring positioned in said enlarged bore and having a sufficiently large opening for the passage of a pipe end therethrough; a retaining ring mounted in said enlarged bore in fixed position, said locking ring being free for axial movement within predetermined limits, said retaining ring having an inclined face directed toward said locking ring and having an opening sufficiently large for the passage of a pipe end therethrough, the engagement of said locking ring with said inclined face tilting said locking ring axially of said retainer into clamping relation with a pipe inserted therethrough.

2. A pipe coupling of the class described adapted for securing adjacent ends of pipes in fixed relation to each other comprising a retainer having a bore formed therein for the reception of a pipe end, said retainer having an enlarged bore communicating with said first mentioned bore; a locking ring positioned in said enlarged bore and having a sufficiently large opening for the passage of a pipe end therethrough; a retaining ring mounted in said enlarged bore in fixed position, said locking ring being free for axial movement within predetermined limits, said retaining ring having an inclined face directed toward said locking ring and having an opening sufficiently large for the passage of a pipe end therethrough, the engagement of said locking ring with said inclined face tilting said locking ring axially of said retainer into clamping relation with a pipe inserted therethrough, and manually operable means cooperating with said retainer for positively moving said locking ring into tilting position.

3. A pipe coupling of the class described adapted for securing adjacent ends of pipes in fixed relation to each other comprising a retainer having a bore formed therein for the reception of a pipe end, said retainer having an enlarged bore communicating with said first mentioned bore; a locking ring positioned in said enlarged bore and having a sufficiently large opening for the passage of a pipe end therethrough; a retaining ring mounted in said enlarged bore in fixed position, said locking ring being free for axial movement within predetermined limits, said retaining ring having an inclined face directed toward said locking ring and having an opening sufficiently large for the passage of a pipe end therethrough, the engagement of said locking ring with said inclined face tilting said locking ring axially of said retainer into clamping relation with a pipe inserted therethrough, and manually operable means cooperating with said retainer for positively moving said locking ring into tilting position, said retaining ring having an axially directed passage formed therethrough for insertion of a tool therein inwardly of the periphery of said locking ring for moving said locking ring into non-clamping position.

4. A pipe coupling of the class described adapted for connecting an end of a pipe in fixed relation comprising a retainer adapted for slipping over one end of a pipe; a locking ring carried by said retainer and movable axially thereof and tiltable relatively thereto and embracing the pipe end and manually operable means carried by said retainer for moving said locking ring into tilted position relatively to the axis of said retainer into clamping relation with the pipe end.

5. A pipe coupling of the class described, comprising: a retainer having a bore formed therethrough and provided with an enlarged bore at each of its ends extending inwardly from each end a portion of its distance; a locking ring positioned in each of said enlarged bores; a retaining ring positioned in each of said enlarged bores and spaced at its inner face from the outer face of the locking ring and having said inner face inclined to the axis, said rings each having an opening therethrough sufficiently large for the passage of a pipe end therethrough, the opening through said locking ring being such that upon engagement of the face thereof with the inclined face of said retaining ring, said locking ring will clamp against the pipe end.

6. A pipe coupling of the class described, comprising: a retainer having a bore formed therethrough and provided with an enlarged bore at each of its ends extending inwardly from each end a portion of its distance; a locking ring positioned in each of said enlarged bores; a retaining ring positioned in each of said enlarged bores and spaced at its inner face from the outer face of the locking ring and having said inner face inclined to the axis, said rings each having an opening therethrough sufficiently large for the passage of a pipe end therethrough, the opening through said locking ring being such that upon engagement of the face thereof with the inclined face of said retaining ring, said locking ring will clamp against the pipe end; and threaded means threaded into said retainer and extending into the enlarged bore for engaging a face of the locking ring and positively moving its opposite face into engagement with the inclined face of the retaining ring.

7. A pipe coupling of the class described, comprising: a retainer having a bore formed therethrough and provided with an enlarged bore at each of its ends extending inwardly from each end a portion of its distance; a locking ring positioned in each of said enlarged bores; a retaining ring positioned in each of said enlarged bores and spaced at its inner face from the outer face of the locking ring and having said inner face inclined to the axis, said rings each having an opening therethrough sufficiently large for the passage of a pipe end therethrough, the opening through said locking ring being such that upon engagement of the face thereof with the inclined face of said retaining ring, said locking ring will clamp against the pipe end; and threaded means threaded into said retainer and extending into the enlarged bores for engaging a face of the locking ring and positively moving its opposite face into engagement with the inclined face of the retaining ring; and an inwardly projecting circumferential rib on the inner surface of said bore intermediate its ends for providing at opposite faces thereof an abutment surface for ends of pipes inserted into said retainer from opposite ends thereof.

ALFRED WARRING.

REFERENCES CITED

The following references are of record in the file of this patent:

UNITED STATES PATENTS

| Number | Name | Date |
| --- | --- | --- |
| 1,898,623 | Gammeter | Feb. 21, 1933 |
| 2,138,253 | Lynch | Nov. 29, 1938 |
| 2,284,018 | Pitt | May 26, 1942 |
| 2,360,732 | Smith | Oct. 17, 1944 |